United States Patent

Nielsen

Patent Number: 6,149,827
Date of Patent: Nov. 21, 2000

[54] DEVICE FOR SEPARATING PARTICLES FROM A PARTICLE CONTAINING LIQUID AND A METHOD FOR CLEANING SUCH A DEVICE

[75] Inventor: Arne Bonnerup Nielsen, Middelfart, Denmark

[73] Assignee: Unicon Beton Holding A/S, Roskilde, Denmark

[21] Appl. No.: 09/029,988

[22] PCT Filed: Sep. 12, 1996

[86] PCT No.: PCT/DK96/00385

§ 371 Date: May 4, 1998

§ 102(e) Date: May 4, 1998

[87] PCT Pub. No.: WO97/10038

PCT Pub. Date: Mar. 20, 1997

[30] Foreign Application Priority Data

Sep. 13, 1995 [DK] Denmark .................... 1019/95

[51] Int. Cl.[7] ............... B01D 21/02; B01D 37/00
[52] U.S. Cl. ............ 210/797; 210/802; 210/221.2; 210/521; 210/540; 210/320
[58] Field of Search ............... 210/752, 758, 210/791, 800, 801, 802, 199, 300, 305, 311, 320, 532.2, 521, 522, 797, 221.2, 540

[56] References Cited

U.S. PATENT DOCUMENTS

| | | | |
|---|---|---|---|
| 2,782,929 | 2/1957 | Colket | 210/320 |
| 3,925,208 | 12/1975 | Yost | 210/320 |
| 4,806,237 | 2/1989 | Ewald, Jr. | 210/320 |
| 4,925,552 | 5/1990 | Bateson et al. | 210/311 |
| 5,240,597 | 8/1993 | Veda | 210/320 |
| 5,340,469 | 8/1994 | Montgomery | 210/320 |

FOREIGN PATENT DOCUMENTS

| | | |
|---|---|---|
| 312117 | 12/1982 | Germany . |
| 63-1408 | 1/1988 | Japan . |
| 133691 | 3/1976 | Netherlands . |
| 147822 | 3/1983 | Netherlands . |

OTHER PUBLICATIONS

PCT International publication No. WO 96/29134.

*Primary Examiner*—Robert J. Popovics
*Attorney, Agent, or Firm*—Dykema Gossett PLLC

[57] ABSTRACT

A clarifier for use in treating a liquid containing non-soluble particles in suspension in order to separate these particles from the liquid includes a tank, a liquid supply duct opening into the bottom portion of the tank and an injector for injecting a gas under pressure into at least part of liquid supplied to the supply duct in order to saturate this liquid with the gas and thus to generate gas bubbles as the saturated liquid is subject to depressurization within the tank. The gas bubbles that are so generated adhere to the particles in suspension in the liquid and lift them up to form a floating layer of sludge in the top portion of the tank. A scraper is provided in the top portion of the tank for skimming off the layer of sludge while it is formed. A plurality of plates extend at an angle within the tank above the supply duct. These plates define a set of upwardly inclined channels each having an upper end that is opened and through which the liquid fed into the tank may enter the channel. A liquid outlet mounted within the lower end of each channel to collect and remove from the tank the liquid that has been treated within the same. Due to its shape and structure, this clarifier occupies a surface area on the ground that 50% or less than any known clarifier of the same capacity. Its structure also permits more microbubbles of a desired size to be maintained for the same amount of injected air in order to increase the probability of contact between the particles and the air bubbles.

7 Claims, 3 Drawing Sheets

DEVICE FOR SEPARATING PARTICLES FROM A PARTICLE CONTAINING LIQUID AND A METHOD FOR CLEANING SUCH A DEVICE

BACKGROUND OF THE INVENTION

1. Field of the Invention

The invention relates to a device for separating particles from a particle—containing liquid. The invention moreover relates to a method of cleaning a device for separating particles from a particle containing liquid, wherein these particles settle on separating elements in the device.

2. The Prior Art

In e.g. biological waste waxer purification plants, separation of the cleaned water and bacterial sludge is performed in addition to the biological cleaning process. This separation usually takes place in tanks in which the sludge precipitates and the clean liquid flows away from the surface area. Such settling plants with precipitation of particles to be separated have considerable dimensions, and the construction of these involves considerable costs partly because of a great consumption of materials and partly because of a great consumption of time for the construction.

DE 31 21 117 discloses a separating device comprising separating chambers with fillers on which pollutants contained in the inflowing water may settle, following which the water flows out at the upper end of the separating chamber. Air may be admitted to clean the fillers of settled material. The released sinking material may then be removed at the lower end of the separating chamber. The separator described affords no possibility of removing light pollution components, which will flow upwards. These will be discharged together with the outflowing water.

NO 147 822 discloses a device for separating suspended particles from water. The arrangement of various chambers of varying flow area provides coalescence of the particles. It is not explained how the removal of the particles from the device takes place.

Further, NO 133 691 discloses a device for separating components of different specific weight from a liquid. The removal of separated components from the device is not explained in this document.

Accordingly, the object of the present invention is to provide a device for separating particles from a particle-containing liquid, which requires considerably less space, and which involves a saving in materials because of a reduced consumption of materials and may moreover be constructed more quickly, while being considerably easier to clean of separated particles.

SUMMARY OF THE INVENTION

The object of the invention is achieved by a device for separating particles from a particle containing liquid and including a separating chamber having a bottom 6 and side walls 2, 4, 5, 7, an inlet 10 for liquid with particles, an outlet 18 for the liquid essentially freed of particles, an outlet 11 for the discharge of particles, wherein at least one separating element 15, on which particles in the liquid may settle, is arranged between the inlet 10 and outlet 18 for liquid, the liquid flowing essentially in a vertical direction between inlet and outlet, wherein means 13 are arranged in the separating chamber 8 below the separating elements 15 to supply a gas under pressure, wherein the liquid outlet 18 communicates with an additional chamber 9 likewise includes a bottom 6 and side walls 2, 3, 4, 7, and wherein one side wall is formed with a liquid outlet 12 whose upper edge is present below the level of the lower edge of the particle outlet 11.

When the device is constructed in this manner, the structure obtained is compact and has a relatively large area on which settling of particles may take place. The structure thus requires less space than previously known structures and moreover involves a saving in materials, which in turn reduces the transport costs to the site of erection and reduces the work in connection with the erection of the structure.

With a view to cleaning the separating elements, the device of the invention is provided with means for the supply of a gas under pressure, preferably compressed air, said means being arranged so that the gas is supplied below the separating elements. The means are preferably constructed to extend horizontally below the separating elements.

Hereby, the rise of the gas between the plate parts of the separating elements will create a strong turbulent liquid flow which will entrain the settled particles. When inlet into and outlet from the separating chamber are provided below an upper edge of a partition, preferably near the bottom of the separating chamber and the air supply takes place in the same area, the supplied gas amount, if supplied in a sufficient amount, will prevent outflow from the separating chamber. This is important, since the outlet opening for particles is provided above the outlet opening for the cleaned liquid. Thus, the supplied gas amount lifts the liquid amount present in the separating chamber and moreover draws additional liquid into the separating chamber, whereby liquid with entrained particles may be flushed out though the outlet opening for these.

Such a cleaning process takes place intermittently. Of course, the time intervals will depend on the amount of particles present in the liquid to be separated. Further, in terms of flow, the device must be dimensioned for the hydraulic load concerned, which, however, will be obvious to a skilled person in view of the above description.

The device may expediently be constructed such that a partition extends in the separating chamber from the bottom and between opposite sides to a height below the height of the lower edge of the particle outlet, separating elements being provided at both sides of the partition, said inlet and outlet for liquid being provided below the upper edge of the partition, thereby producing an upward and a subsequent downward flow in the separating chamber.

The separating elements preferably consist of a plurality of plates or slats, optionally having a corrugated shape, said plates being assembled and arranged so as to allow the liquid to flow past the plates in the space between these. The flow is thus generally in a vertical direction.

After having been used for some time, the separating elements of such a device will be covered by a layer of particles which may interfere with the flow or perhaps cause a poorer separation of particles because of changed operational conditions, and it is therefore necessary to clean the separating elements of the device at intervals.

Accordingly, a further object of the invention is to provide a method of cleaning a device according to the invention.

The object is achieved with respect to the method in that a gas under pressure is supplied to the liquid in the device at a level below the lower edge of the separating elements, and that the gas under pressure is supplied in an amount ensuring that essentially no liquid flows toward the outlet opening during the supply of gas, and that the liquid with the released particles is lifted to the particle outlet opening.

It is mentioned above that the invention is used in connection with separation of water and biological sludge from waste water treatment plants. However, the invention a may also be applied in other fields where particles are to be separated from a liquid.

BRIEF DESCRIPTION OF THE DRAWINGS

An embodiment of the device of the invention will be explained more fully below with reference to the drawing, in which

As appears from FIG. 1, the separator 1 comprises outer side walls 2, 3, 4 and 5 as well as a bottom 6. A partition 7 is arranged between the side walls 2 and 4, thereby defining two chambers, viz. the separating chamber 8 and the outlet chamber 9. The side wall 5 is formed with an inlet 10 for particle containing liquid and an outlet 11 for particles. The side wall 2 is formed with an outlet 12 for the cleaned liquid from the outlet chamber 9. FIG. 1 moreover shows two pipes 13 intended for the supply of compressed air. These comprise horizontal parts which extend below the separating elements.

FIG. 2 is a top view of the device of the invention. It appears from the figure that the separating chamber is moreover divided into two chambers by means of a partition 14. Separating elements 15 are provided between the side wall 5 and the partition 14 as well as between the partition 14 and the partition 7. The outlet chamber moreover includes a measuring weir 16, which appears more clearly from FIGS. 3 and 4. The partition 14 extends to a height which is below the level of the outlet opening 12 and the measuring weir 16, respectively.

FIG. 3 shows a section along the A—A in FIG. 2. It appears from the figure that the partition 7 is formed with an opening 18 at the bottom which provides access from the separating chamber 8 to the outlet chamber 9.

FIG. 4, which is a sectional view of the device along the line B—B, shows the positions of the various inlets to and outlets from the device as well as passages through various chambers in the device. Further, the flow paths of the particle containing water to be cleaned and of the cleaned water are illustrated by arrows. Moreover, the figure shows clearly how the various openings and passages are positioned with respect to each other in terms of level and with respect to the height of the partition 14. Also shown are the two pipes for the supply of compressed air to clean the separating elements.

FIG. 5 shows two corrugated plates 17 which form part of a separating element. The plates are corrugated at an angle of approximately 60° with respect to the vertical direction in an assumed position. When such plate elements are placed on top of each other so that the corrugations of the plates intersect each other, it is ensured that the liquid flowing between the plates through a separating element, is forced toward the arched surfaces on which the contained particles settle. The settling is caused by the rate profile of the flow. The flow rate of the liquid is zero at the plate surface and very close to zero at a small distance from the plate. Then, no or just small hydraulic forces affect the particles, and these can thus settle on the plates and be retained there by the surface tension between the particles and plate.

Figure 1:
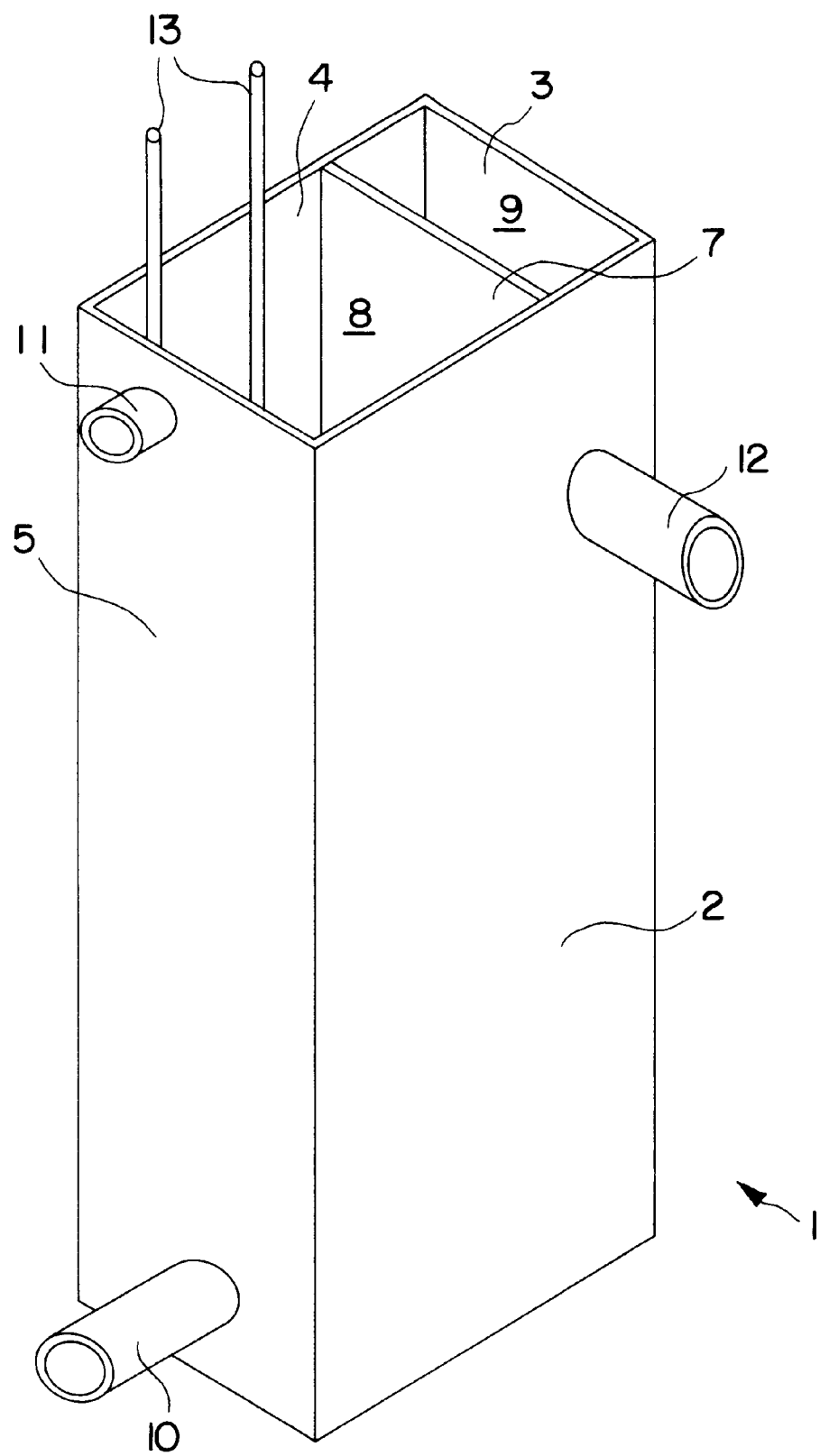
FIG. 1 is a perspective view of the device.
Figure 2:
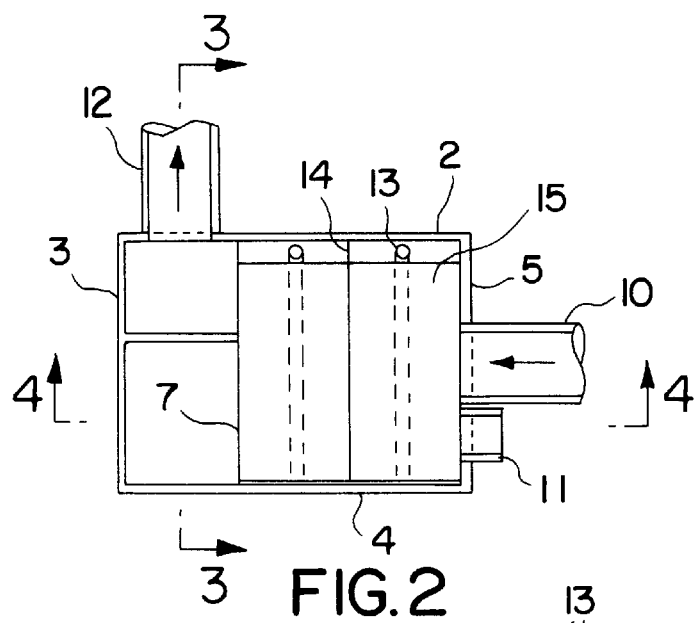
FIG. 2 is a top view of the device.
Figure 3:
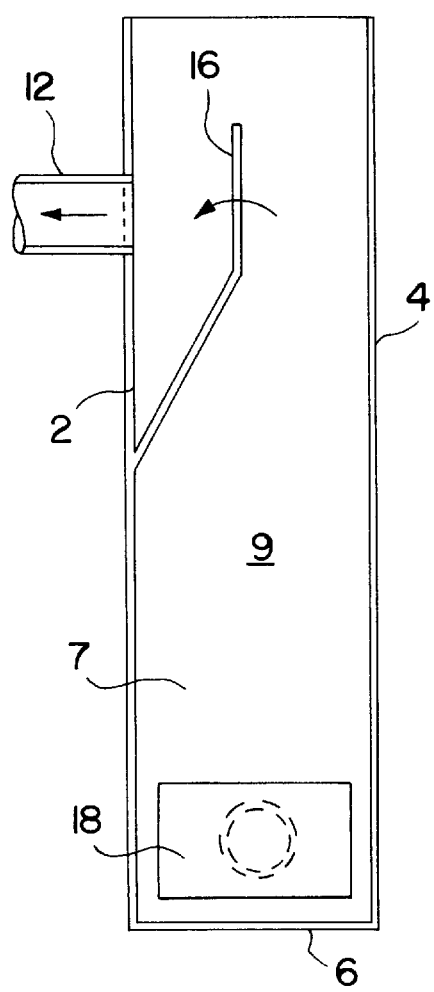
FIG. 3 is a vertical section along the line 3—3 in FIG. 2.
Figure 4:
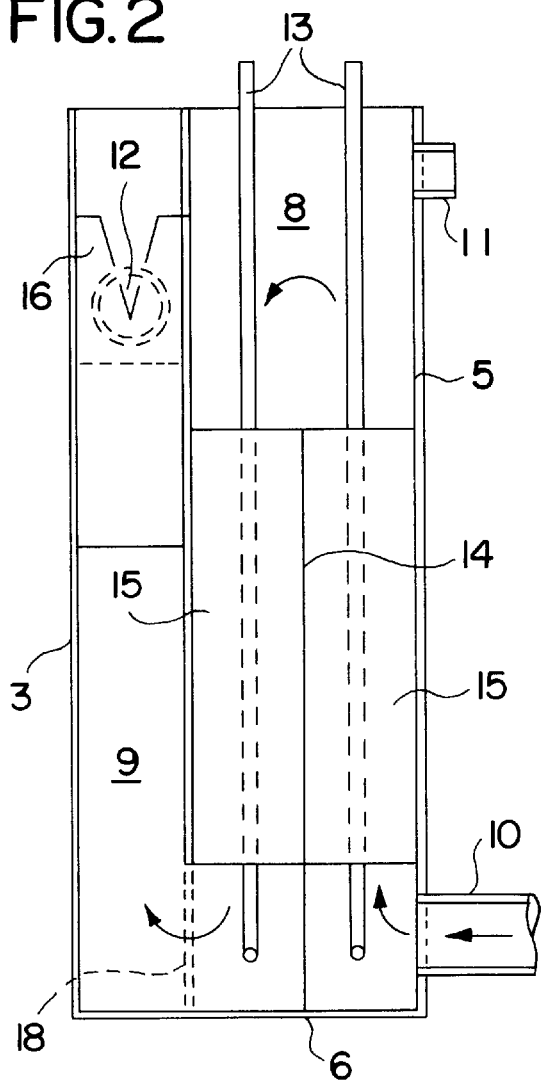
FIG. 4 is a vertical section along the line 4—4 in FIG. 2.
Figure 5:
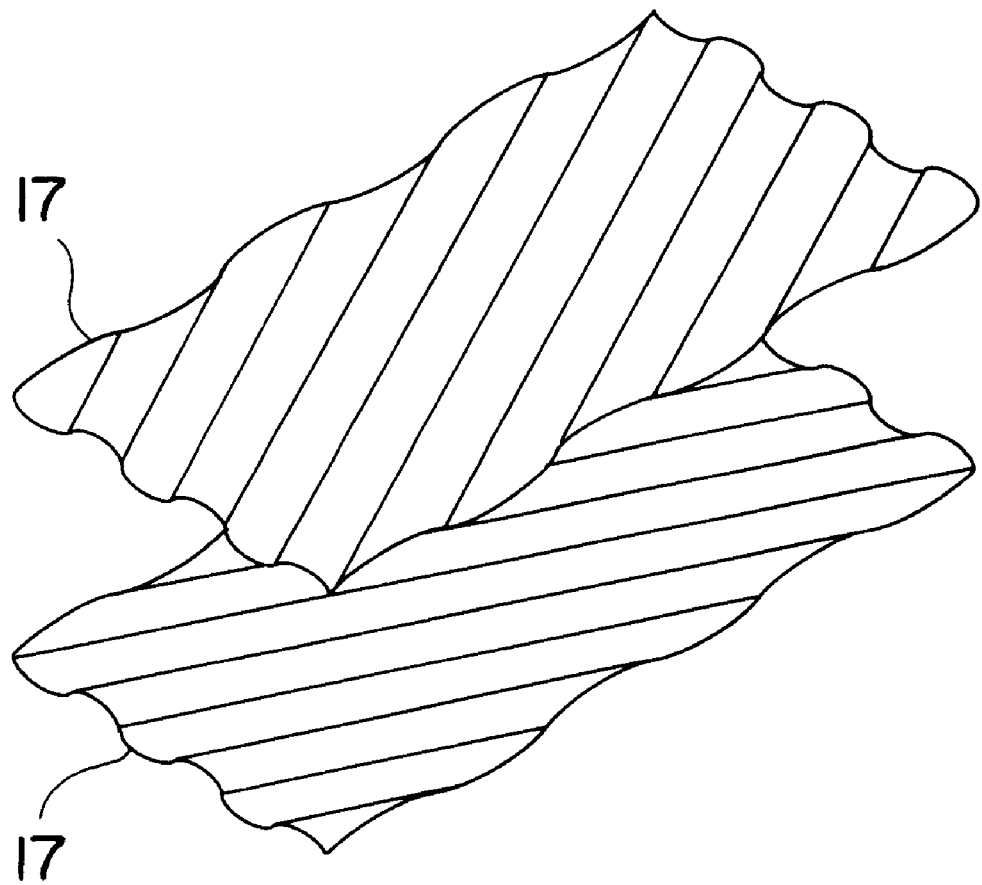
FIG. 5 shows two corrugated plate elements which form part of a separating element.

What is claimed is:

1. A device for separating particles from a particle-containing liquid, said device comprising a first chamber and a second chamber, said first chamber including:

a bottom;

side walls;

an inlet for liquid with particles;

a first chamber outlet for the liquid essentially freed of particles;

a particle discharge outlet arranged in one of said side walls, said inlet and said first chamber outlet being arranged at a location below said particle discharge outlet;

at least one separating element upon which said particles may settle being arranged in said first chamber for producing said liquid essentially freed of particles, said first chamber defining an essentially vertical flow path of said liquid from said inlet through said at least one separating element to said first chamber outlet in a particle separating state of said device, said first chamber outlet being in fluid communication with said second chamber;

means for supplying a gas under pressure to the interior of said first chamber in a separating element cleaning and particle discharge state of said device;

said second chamber including:

a bottom;

side walls;

a liquid outlet formed in one of said side walls, said liquid outlet having an upper edge arranged below the level of a lower edge of said particle outlet and above said first chamber outlet, said supply of gas to said first chamber being arranged below said at least one separating element, said first chamber outlet being arranged such that said supply of gas draws liquid into said first chamber and generates a flow of said liquid essentially freed of particles through said at least one separating element in said first chamber and through said particle discharge outlet to define said separating element cleaning and particle discharge state.

2. A device for separating particles from a particle-containing liquid, said device comprising a first chamber and a second chamber, said first chamber including:

a bottom;

side walls;

an inlet for liquid with particles;

a first chamber outlet for the liquid essentially freed of particles;

a particle discharge outlet arranged in one of said side walls, said inlet and said first chamber outlet being arranged at a location below said particle discharge outlet;

a partition extending from said bottom to a height below said particle discharge outlet, said inlet being arranged on a first side of said partition and said first chamber outlet being arranged on a second side of said partition, said partition defining together with said side walls an essentially vertical flow path of said liquid from said inlet to said first chamber outlet in a particle separating state of said device, at least one separating element upon which said particles may settle being arranged in said flow path;

means for supplying a gas under pressure to the interior of said first chamber in a separating element cleaning and particle discharge state of said device, said supply of gas being such as to provide a flow of said liquid from said first chamber through said particle discharge outlet to define said separating element cleaning and particle discharge state, said gas being supplied at a location below said at least one separating element in the area of said inlet and first chamber outlet, said first chamber outlet being in fluid communication with said second chamber, said second chamber including:

a bottom;

side walls;

a liquid outlet formed in one of said side walls, said liquid outlet having an upper edge arranged below the level of a lower edge of said particle outlet.

3. A device according to claim 2, wherein said separating elements are arranged on either side of said partition.

4. A device according to claim 3, wherein said outlet and said inlet are arranged at said bottom.

5. A device according to claim 2, wherein said partition has an upper edge, said upper edge being arranged below the level of a lower edge of said liquid outlet.

6. A device according to claim 2, wherein said first chamber and said second chamber have a common side wall.

7. A method of cleaning a device used to separate particles from a particle-containing liquid, said device comprising a first chamber and a second chamber, said first chamber comprising a bottom, side walls, an inlet for particle-containing liquid, a first chamber outlet for liquid essentially free of particles, a particle discharge outlet in one of said side walls, said inlet and said first chamber outlet being located below said particle discharge outlet, a partition extending from said bottom to a height below said particle discharge outlet, said inlet being located on a first side of said partition and said first chamber outlet being arranged on a second side of said partition, said partition defining together with said side walls an essentially vertical flow path of said liquid from said inlet to said first chamber outlet in a particle separating state of said device, at least one separating element upon which said particles may settle being located in said flow path, said second chamber including a bottom, side walls, and a liquid outlet formed in one of said side walls, said liquid outlet having an upper edge located below said particle outlet, said method of cleaning comprising the steps of:

(a) supplying gas under pressure to said first chamber at a location below said at least one separating element so as to provide a flow of said liquid from said first chamber to said particle discharge outlet, and (b) removing particles from said first chamber through said particle discharge outlet.

* * * * *